FREDERICK P. JAQUITH.
Improvement in Threshing Machines.
No. 121,377.   Patented Nov. 28, 1871.
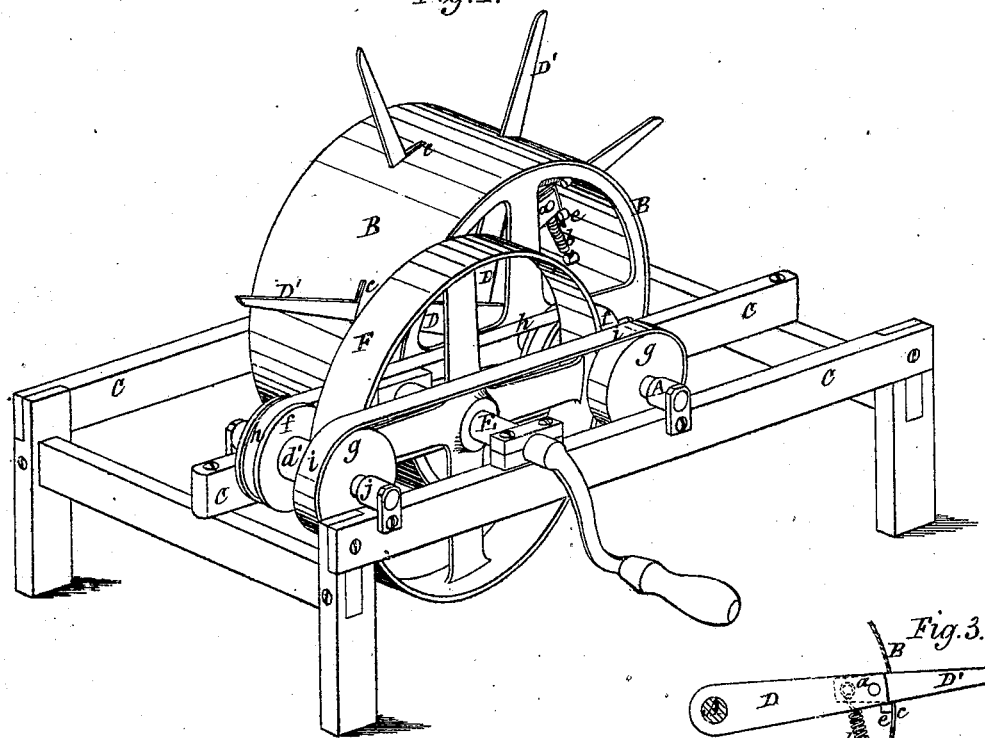
Fig. 1.
Fig. 3.
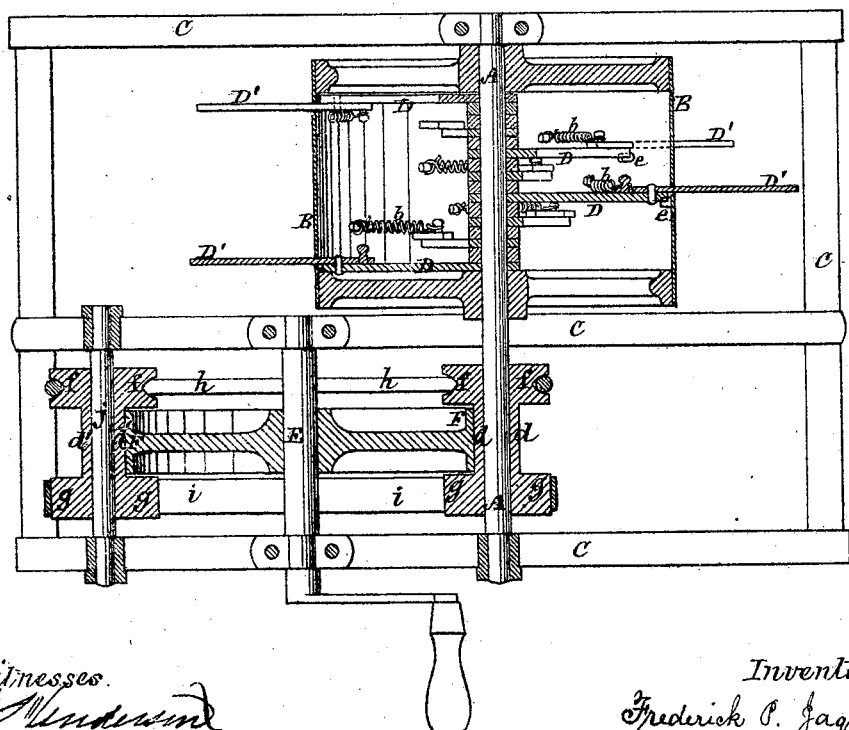
Fig. 2.
Witnesses.
W. S. Henderson
Edmund Masson.
Inventor:
Frederick P. Jaquith.
By atty. A. B. Stoughton.

UNITED STATES PATENT OFFICE.

FREDERICK P. JAQUITH, OF HOOSICK FALLS, NEW YORK.

IMPROVEMENT IN THRASHING-MACHINES.

Specification forming part of Letters Patent No. 121,377, dated November 28, 1871.

*To all whom it may concern:*

Be it known that I, FREDERICK P. JAQUITH, of Hoosick Falls, in the county of Rensselaer and State of New York, have invented certain new and useful Improvements in Thrashing-Machines and Driving Power therefor; and I do hereby declare the following to be a full, clear, and exact description of the same, reference being had to the accompanying drawing making a part of this specification, in which—

Figure 1 represents in perspective a thrashing-cylinder and the mechanism for driving it applied thereto. Fig. 2 represents a horizontal section through the same, and Fig. 3 represents one of the jointed teeth of the thrashing-cylinder detached therefrom.

Similar letters of reference where they occur in the separate figures denote like parts in the drawing.

My invention consists, first, in the manner of making and connecting the teeth to the cylinder and its shaft, viz., arranging them loosely on the shaft and making a flexible spring-joint in them near to where they pass through and work in a slot in the cylinder; and my invention further consists in the manner in which I construct, arrange, and combine the driving mechanism for rotating the thrashing-cylinder.

To enable others skilled in the art to make and use my invention, I will proceed to describe the same with reference to the drawing.

The shaft A of the thrashing-cylinder B is supported in suitable bearings in or on the frame C, and are united so as to revolve together. On the shaft A, and within or between the heads of the cylinder B, are arranged loosely any suitable number of radial arms D, which have united to them, just within or under the shell or jacket of the cylinder, as at $a$, jointed teeth D', controlled by a spring, $b$, and passing through slots $c$ cut in the jacket of the cylinder. The arms D, though loose on the shaft A, are controlled in the extent of motion they can have around or on the shaft in one direction by a stud or stop, $e$, set in the shell of the cylinder, against which they are drawn by the reaction of the spring $b$, and when they move in the opposite direction they do so against the resistance of said spring. The springs $b$ are attached to the shell and to the teeth D'; but as the arms D are pivoted to these teeth, and the teeth are really but a prolongation of the arms, the springs control both to the extent of its reactive force. The object of the yielding of the arms and teeth is to relieve the shaft and cylinder of the force transmitted through them when at work, and to prevent the parts from breaking. On the frame C is also hung or supported a shaft, E, carrying a main drive-wheel, F, which drive-wheel F has frictional contact, though it may be cogged or geared contact, with the drums $d$ $d'$, which carry pulleys $f$ $g$, around which pass endless belts $h$ $i$. The drum $d$ is fast on the main shaft A, and gives said shaft and the cylinder B attached to it their motion; and the drum $d'$ is arranged upon a shaft, $j$, supported in the main frame at a point diametrically opposite from the drum $d$, so that the tendency of the belts $h$ $i$ is to prevent the main drive-wheel F from forcing the drums and pulleys away from itself or springing or straining their shafts or bearings. The belt $h$ is represented as a round one and as running in a grooved pulley or pulleys; the other belt $i$ is represented as a flat band. Either or both may be used, as preferred.

This arrangement of driving power, while shown as especially applied to thrashers, may be used for other purposes.

Having thus fully described my invention, what I claim is—

1. In combination with the thrashing-cylinder and its shaft, a series of arms or teeth loosely placed on said shaft, and having spring-joints in them, as at $a$, and passing through slots in the shell of the cylinder, as and for the purpose described and represented.

2. In combination with a thrashing-cylinder and its spring-arms and beaters, as described, the driving mechanism consisting of the shafts, pulleys, and belts, substantially as described, and for the purpose set forth.

FREDERICK P. JAQUITH.

Witnesses:
A. B. STOUGHTON,
EDMUND MASSON.